United States Patent
Lee et al.

(10) Patent No.: US 7,522,351 B2
(45) Date of Patent: Apr. 21, 2009

(54) LENS DRIVING DEVICE

(75) Inventors: Dong Kyun Lee, Seoul (KR); Burhanettin Koc, Kyungki-do (KR); Ki Mun Baik, Kyungki-do (KR); Jung Ho Ryu, Kyungki-do (KR); Jung Seok Lee, Kyungki-do (KR); Byung Woo Kang, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 122 days.

(21) Appl. No.: 11/521,294

(22) Filed: Sep. 15, 2006

(65) Prior Publication Data
US 2007/0133972 A1     Jun. 14, 2007

(30) Foreign Application Priority Data
Dec. 9, 2005     (KR) ................. 10-2005-0120338

(51) Int. Cl.
*G02B 15/14* (2006.01)
*G02B 7/02* (2006.01)

(52) U.S. Cl. ..................... 359/694; 359/813

(58) Field of Classification Search ........ 359/694, 359/696, 698, 703–704, 813–814, 822–826
See application file for complete search history.

(56) References Cited

U.S. PATENT DOCUMENTS 5,644,440 A   7/1997   Akada

| 5,812,330 A | * | 9/1998 | Akada .................. 359/823 |
| 6,091,552 A | * | 7/2000 | Ueyama ................ 359/694 |
| 6,215,605 B1 | | 4/2001 | Kuwana et al. |
| 6,268,970 B1 | | 7/2001 | Ito et al. |

FOREIGN PATENT DOCUMENTS

| JP | 8-179184 | 7/1996 |
| JP | 2003-15014 | 1/2003 |
| JP | 2005-57839 | 3/2005 |
| JP | 2008-520174 | 6/2008 |
| WO | 2004/057518 | 7/2004 |
| WO | 2006/050759 | 5/2006 |

OTHER PUBLICATIONS

Office Action mailed on Jul. 1, 2008 and issued in corresponding Japanese Patent Application No. 2006-251188.

* cited by examiner

*Primary Examiner*—Scott J Sugarman
*Assistant Examiner*—Dawayne A Pinkney

(57) ABSTRACT

The present invention relates to a lens driving device includes a lens receiving part with a lens disposed therein, having first and second extension parts formed at opposed sides in a predetermined interval from each other. The lens driving device also includes an actuator having a body between the first and second extension parts. The actuator body has first and second output members contacting the first and second extension parts of the lens receiving part at opposed ends thereof, and thereby expands, contracts and bends when power is applied. The lens driving device also includes a preload member compressing the first and second extension parts against the actuator body to maintain a status of pressed contact. The lens driving device further includes a guide part for guiding the movement of the lens receiving part in an optical axis direction.

12 Claims, 8 Drawing Sheets

(a)

(b)

LENS DRIVING DEVICE

CLAIM OF PRIORITY

This application claims the benefit of Korean Patent Application No. 2005-120338 filed on Dec. 9, 2005, in the Korean Intellectual Property Office, the disclosure of which is incorporated herein by reference.

BACKGROUND OF THE INVENTION

1. Field of the Invention

The present invention relates to a device for driving a lens adopted in an optical system, and more particularly, to a lens driving device which drives a lens barrel in an optical axis direction more stably to improve optical characteristics of an optical device, generates high drive power with low input power to increase the speed of driving a lens, has a large transport range of the lens, and has a minimal loss of power transmission to increase driving efficiency.

2. Description of the Related Art

In general, optical apparatuses include lens driving devices which move lenses using cam structures, screws or piezoelectric elements. The lens driving devices adopt motors or piezoelectric elements for generating drive power while using cam structures or screws for transmitting the drive power.

Therefore, a lens driving device moves a lens with drive power to change a relative distance of the lens, thereby zooming or focusing.

FIG. 1 illustrates a zoom lens barrel 10 for moving a lens using a cam structure disclosed in U.S. Pat. No. 6,268,970.

In the U.S. Pat. No. 6,268,970, lenses 12a, 14a and 16a are moved along the cam curves formed on barrels 12, 14 and 16, respectively, to maintain relative distances of the lenses necessary for zooming or focusing.

In such a structure, the relative position of each of the lenses 12a, 14a and 16a is determined according to the configuration of a cam structure and an electromagnetic motor is used as a driving source. However, the zoom lens barrel 10 has a plurality of driven reduction gears and is configured to convert the rotation of the barrel moving along the cam curve into linear motion, complicating the structure thereof.

In addition, the above described lens driving device has the plurality of reduction gears, which makes it difficult for miniaturization. Further, it uses an electromagnetic motor, requiring high power, generates electromagnetic waves harmful to humans, and has low positioning resolution of the lens.

FIG. 2 illustrates a zoom lens mechanism of a camera which drives a lens using a screw.

That is, a camera body 22 with an inner space therein has a fixed lens 22a coupled therewith at a subject side. An electromagnetic motor 24 is installed in the inner space of the camera body 22, and a guide screw 24a is coupled with a shaft of the motor 24.

A power transmission member 26 is coupled with an outer circumference of the guide screw 24a, and a lens barrel 28 is coupled with a side of the power transmission member 26.

In addition, a movable lens 28a is coupled with the lens barrel 28, and the barrel 28 is disposed movable along an optical axis with the assistance of a guide shaft 29 that is disposed inside the camera body 22 in the optical axis direction.

Therefore, when the motor 24 operates, the guide screw 24a rotates to move the power transmission member 26 in the optical axis direction. As the power transmission member 26 moves in the optical axis direction, the barrel 28 is guided by the guide shaft 29, moving in the optical axis direction as well, thereby zooming.

However, the zoom lens mechanism 20 of the camera also adopts an electromagnetic motor, thus requiring a plurality of reduction gears, which makes it difficult for miniaturization. In addition, it is impossible to prevent generation of electromagnetic waves by the motor. Further, the mechanism 20 has low positioning resolution, hindering precise control.

To overcome the aforementioned problems, FIGS. 3a and 3b illustrate a driving device 30 for moving a lens using piezoelectric elements disclosed in U.S. Pat. No. 6,215,605.

That is, the piezoelectric elements 32 are fixed to a base block 34 to transmit displacement to driving rods 36, thereby moving the lenses L1, L2, L3 and L4 with preload generated by sliders 38a, together with inertia and acceleration of lens frames 38. According to the waveform of an input voltage, the lens frames 38 move or slide with the driving rods 36 to enable bidirectional driving.

The driving device 30 does not adopt an electromagnetic motor, and thus electromagnetic waves are not generated. It also does not adopt reduction gears for power transmission, thereby simplifying the structure thereof.

However, as the driving rods are essentially fixed, it is impossible to vary the length of the barrel, thus limiting miniaturization. Also, the driving signal has an asymmetrical waveform rather than a stationary sine waveform, complicating a driving circuit.

In addition, when the lenses L1, L2, L3 and L4 are moved, the sliding friction generated between the driving rod 36 and the sliders 38a significantly degrades driving efficiency, resulting in a great loss of drive power. Moreover, the characteristics of the driving rod 36 and the slider 38a may change as they wear out.

Therefore, there arises a need for a lens driving device which can be mounted in a small volume, having a high resolution to enable precise control, and can operate with low drive power while having a sufficient transport range.

SUMMARY OF THE INVENTION

The present invention has been made to solve the foregoing problems of the prior art and therefore an object of certain embodiments of the present invention is to provide a lens driving device which moves a lens barrel in an optical axis direction more stably to improve optical characteristics of an optical device, generates high drive power with low input power to increase the speed of moving a lens, having an increased transport range of a lens, and minimizes loss of drive power transmission to increase driving efficiency.

According to an aspect of the invention for realizing the object, there is provided a lens driving device including: a lens receiving part with a lens disposed therein, the lens receiving part having first and second extension parts formed at opposed sides in a predetermined interval from each other; an actuator having a body between the first and second extension parts, the actuator body having first and second output members contacting the first and second extension parts of the lens receiving part at opposed ends thereof, thereby expanding, contracting and bending when power is applied, whereby the actuator provides power necessary for driving the lens receiving part; a preload member provided above the actuator, the preload member compressing the first and second extension parts against the actuator body to maintain a status of pressed contact between the first and second extension parts and the first and second output members; and a guide part for guiding the movement of the lens receiving part in an optical axis direction.

Preferably, the lens receiving part comprises a lens barrel for receiving the lens and a barrel holder for receiving the lens barrel in a center thereof, the barrel holder having the first and second extension parts at outer ends thereof.

Preferably, the actuator comprises a piezoelectric ultrasonic motor having the rectangular parallelepiped body with a plurality of piezoelectric elements stacked.

Preferably, the first and second output members comprise frictional members.

Preferably, both of the first and second output members have tips which are configured to make elliptical movements in opposite directions from each other.

Preferably, the preload member comprises a horizontal plate disposed above the actuator body, the horizontal plate having free elastic ends at opposed ends thereof bent perpendicular to the horizontal plate, the free elastic ends contacting tips of the first and second output members, respectively.

More preferably, the free elastic ends extend in such a length to be positioned lower than locations where inner surfaces of the first and second extension parts contact the tips of the first and second output members.

More preferably, the free elastic ends have protrusions protruded toward the first and second extension parts.

Preferably, the guide part comprises a guide groove recessed at an outer surface of the lens receiving part and a guide rod disposed in contact with the guide groove.

Preferably, the guide part comprises a guide hole perforated in an outer surface of the receiving part and a guide rod inserted through the guide holes.

Preferably, the lens driving device further includes a base disposed below the lens receiving part, the base having an actuator supporter for supporting the actuator horizontally and a guide rod holder into which a guide rod is assembled.

More preferably, the actuator supporter comprises a body in contact with a lower surface of the actuator body and a pair of vertical ribs extended vertically upward from the body to hold the actuator body stably.

More preferably, each of the vertical ribs has a protrusion at an upper end thereof, the protrusion hooking onto an upper surface of the actuator body to prevent the actuator body from being detached.

BRIEF DESCRIPTION OF THE DRAWINGS

The above and other objects, features and other advantages of the present invention will be more clearly understood from the following detailed description taken in conjunction with the accompanying drawings, in which:

FIG. 3b is a partial exploded perspective view of the lens driving device shown in FIG. 3a;

DETAILED DESCRIPTION OF THE PREFERRED EMBODIMENT

Preferred embodiments of the present invention will now be described in detail with reference to the accompanying drawings.

Figure 1:
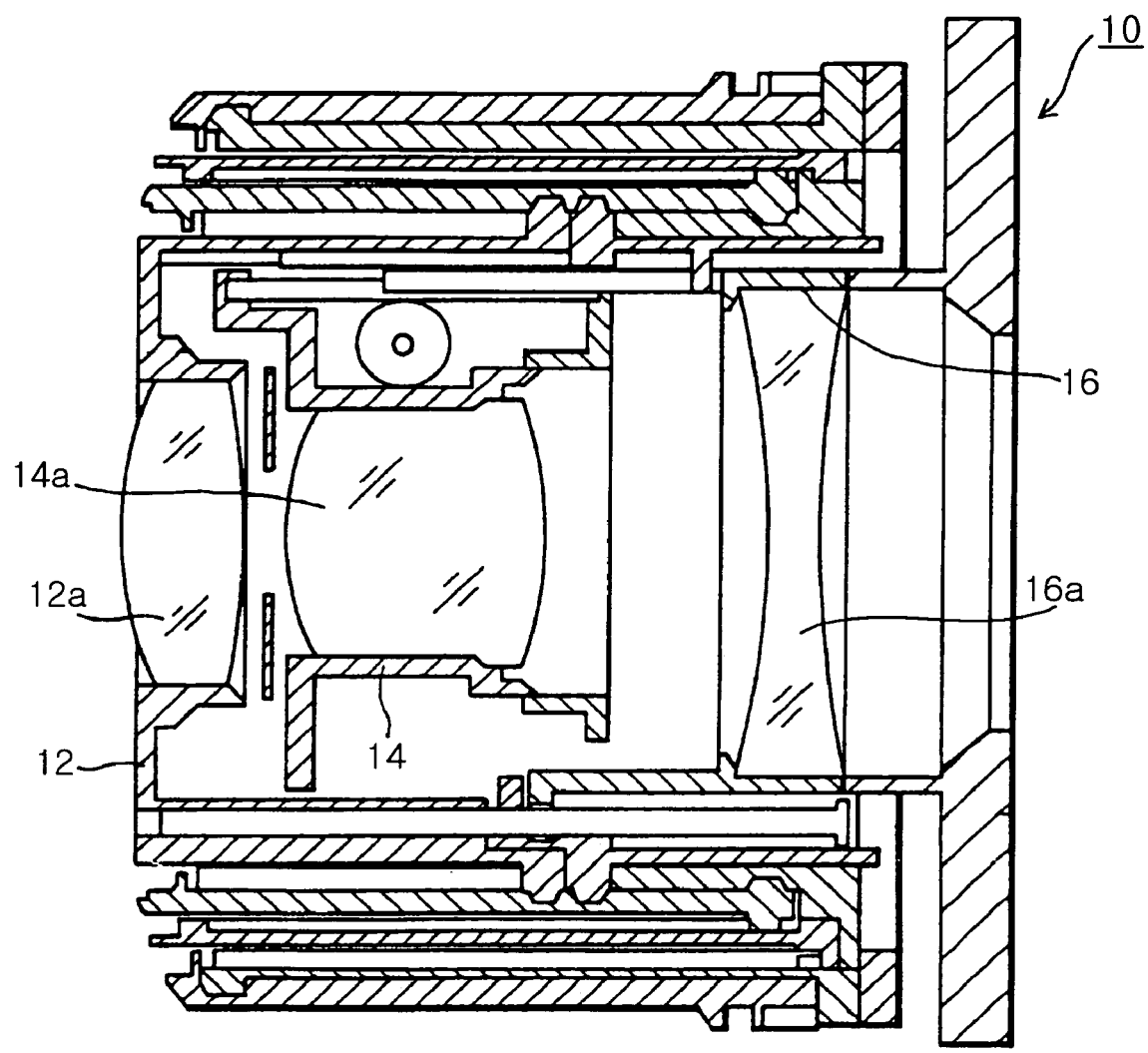
FIG. 1 is a sectional view illustrating a conventional lens driving device using a cam structure.
Figure 2:
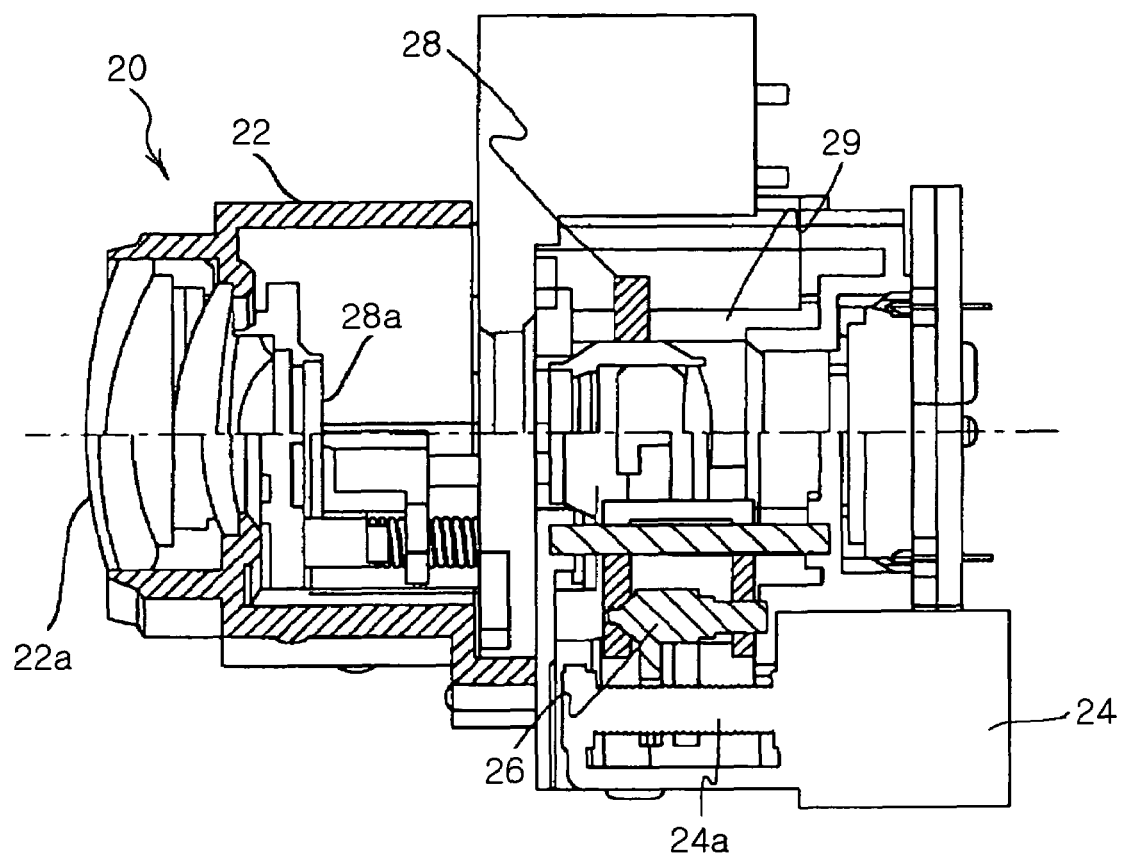
FIG. 2 is a sectional view illustrating a conventional lens driving device using a screw.
Figure 3A:
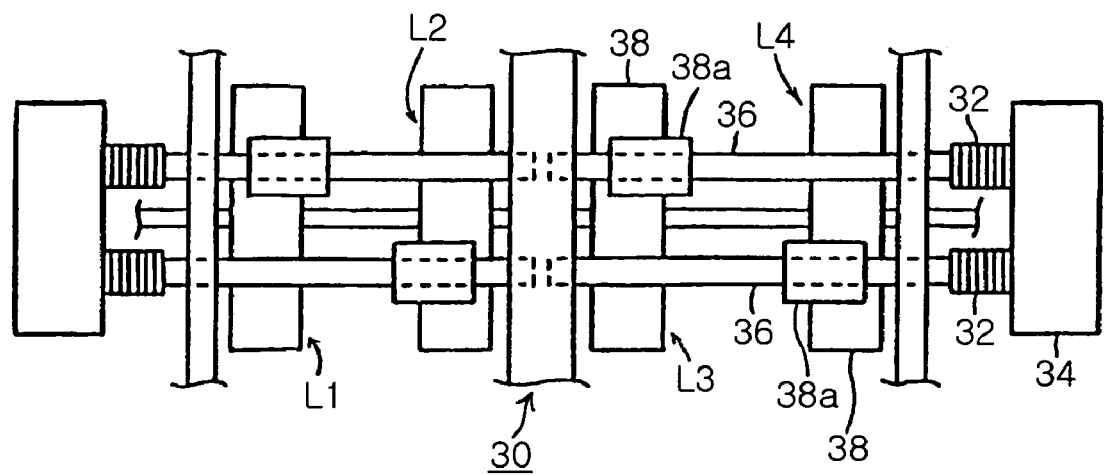
FIG. 3a is an overall plan view illustrating a conventional lens driving device using piezoelectric elements.
Figure 3B:
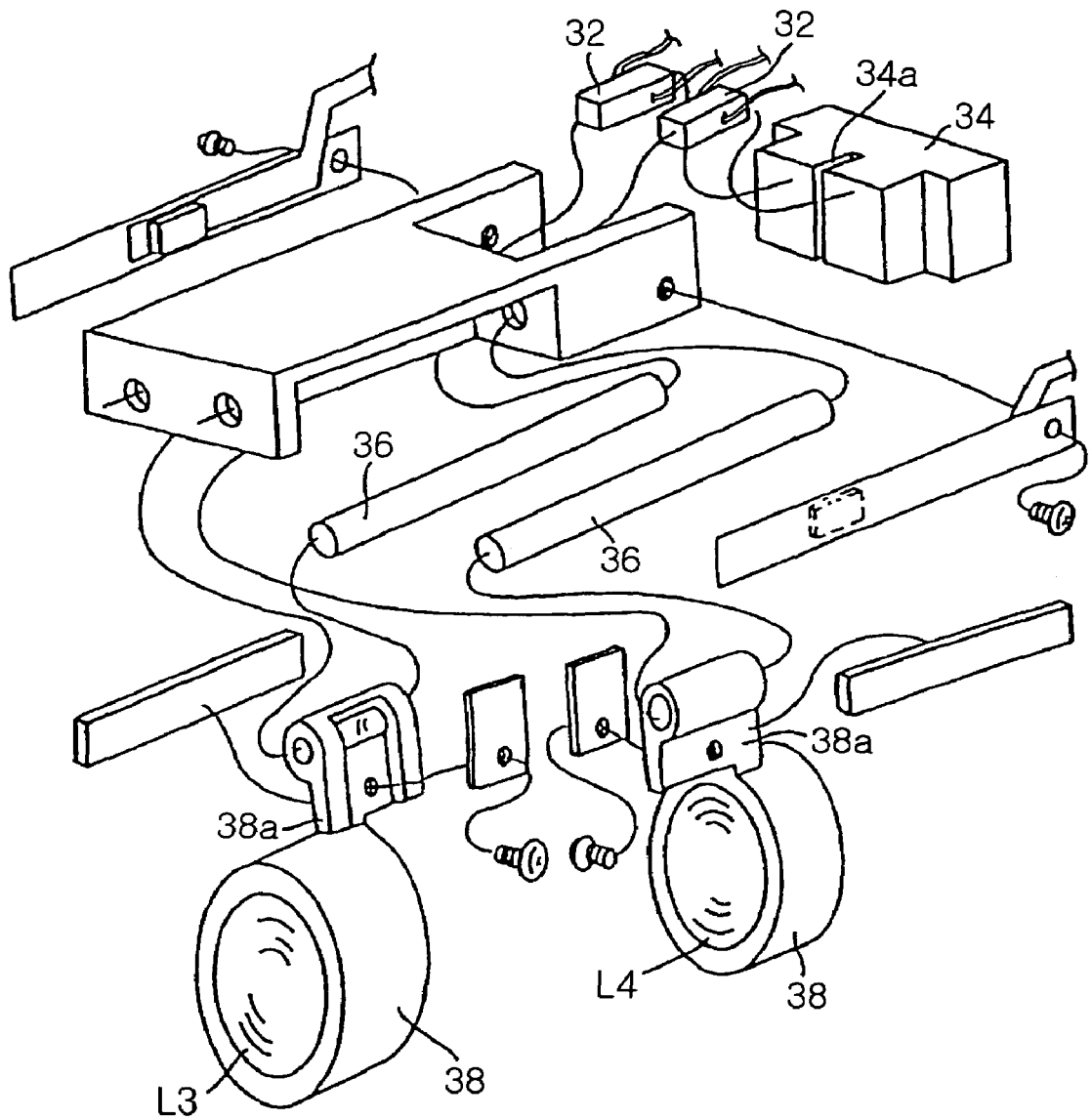
Figure 4:
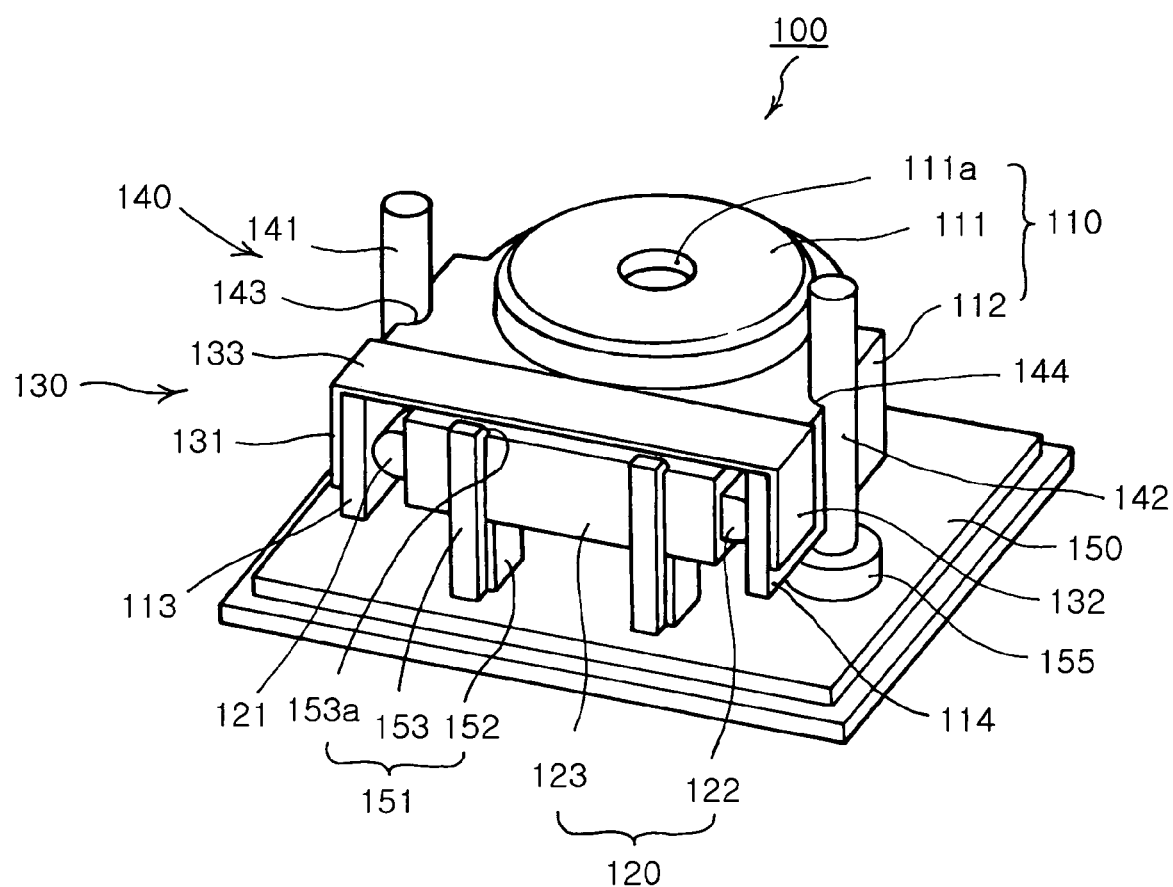
FIG. 4 is an overall perspective view illustrating a lens driving device according to the present invention.
Figure 5:
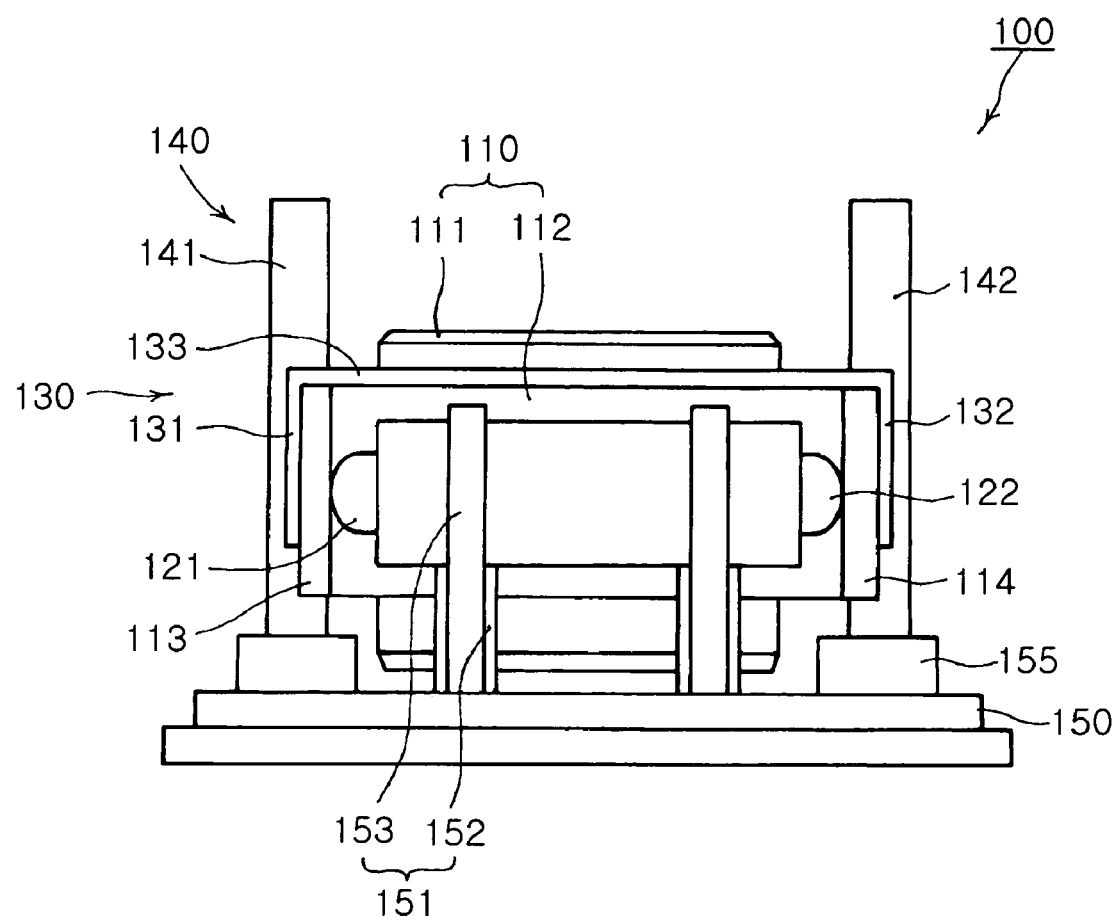
FIG. 5 is a front view illustrating the lens driving device according to the present invention.
Figure 6:
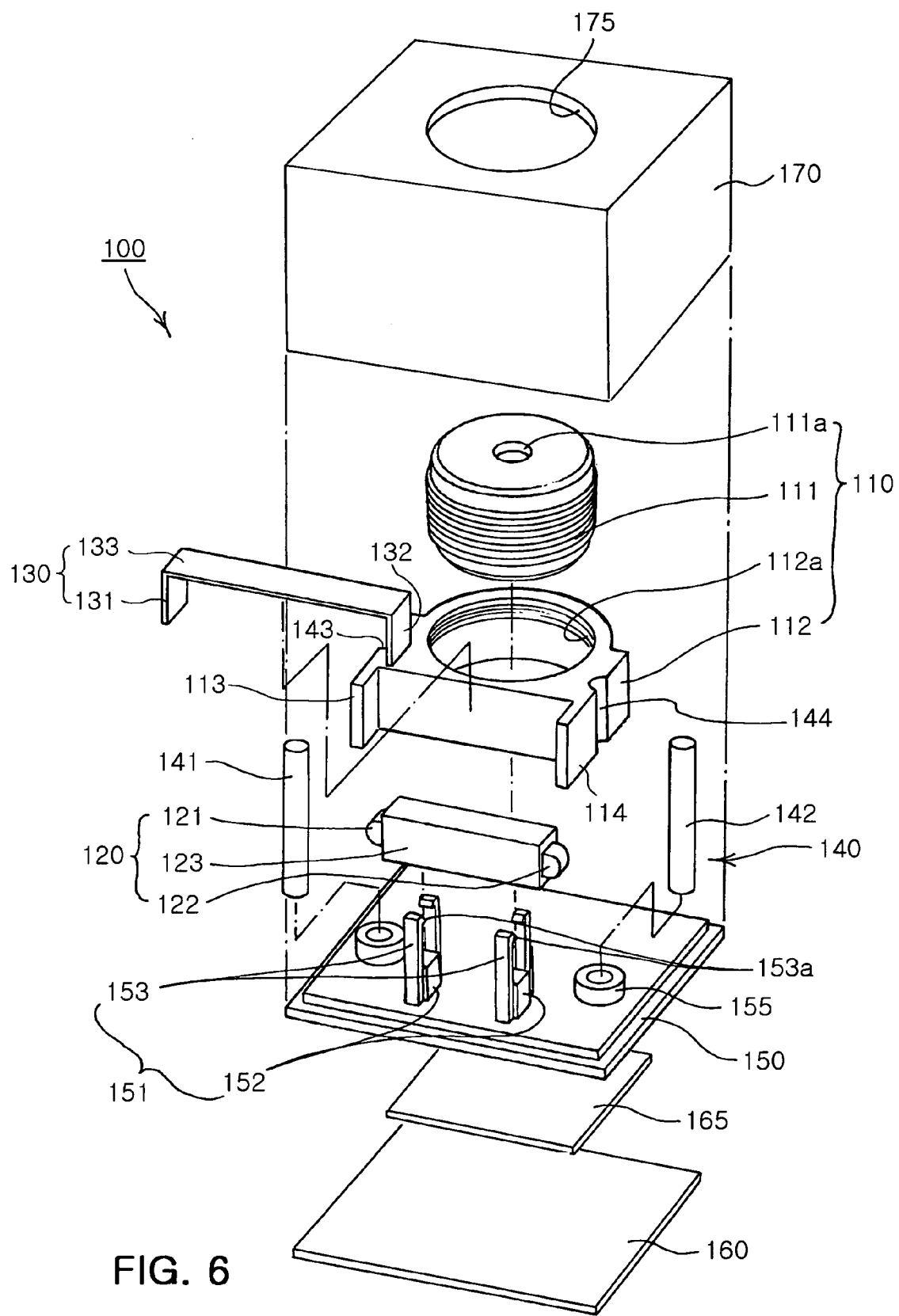
FIG. 6 is an exploded perspective view illustrating the lens driving device according to the present invention.
Figure 7:
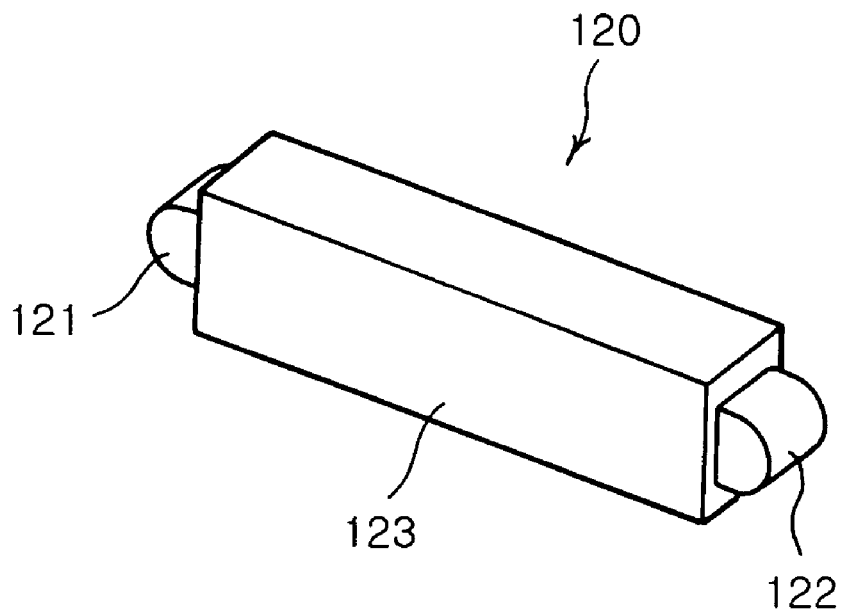
FIG. 7 illustrates an actuator adopted in the lens driving device according to the present invention in which (a) is a perspective view and (b) illustrates the operation thereof.
Figure 7:
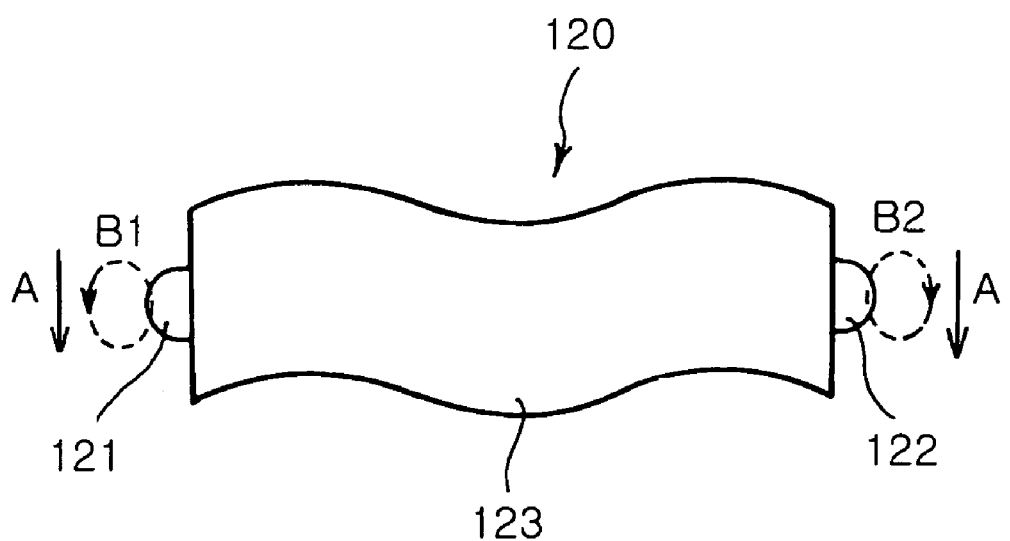

FIG. 4 is an overall perspective view illustrating a lens driving device according to the present invention, FIG. 5 is a front view illustrating the lens driving device according to the present invention, and FIG. 6 is an exploded perspective view illustrating the lens driving device according to the present invention.

As shown in FIGS. 4 to 6, the lens driving device 100 according to the present invention includes a lens receiving part 110 containing at least one lens therein, an actuator 120 for providing drive power for moving the lens, a preload member 130 applying pressure to the actuator 120, and a guide part 140 for guiding the movement of the lens receiving part 110.

That is, the lens receiving part 110 is a structure having a predetermined dimension of inner space in which at least one lens (not shown) is arranged along an optical axis. The lens receiving part 110 has first and second extension parts 113 and 114 provided at an outer surface facing the actuator 120. The extension parts 113 and 114 are opposed to each other with a predetermined interval therebetween.

Such a lens receiving part 110 includes a hollow lens barrel 111 containing the lens therein and a barrel holder 112 having a central hole 112a perforated in a center thereof for receiving the lens barrel 111. The barrel holder 112 has the first and second extension parts 113 and 114 extended in parallel from an outer surface thereof.

Here, it is preferable that the central hole 112a of the barrel holder 112 has female threads to be engaged with male threads formed on an outer surface of the lens barrel 111. And a light opening 111a is perforated in a predetermined dimension in alignment with an optical axis on an upper surface of the lens barrel 111.

In addition, the actuator 120 includes a body 123 which expands, contracts and bends when power is applied, to provide drive power necessary for moving the lens receiving part 110 back and forth in the optical axis direction. The actuator 120 also has first and second output members 121 and 122 provided at opposed ends of the actuator body 123 with tips thereof in contact with inner surface portions of the first and second extension parts 113 and 114.

Such an actuator 120 has the first and second output members 121 and 122 at opposed ends thereof so that the actuator body 123 thereof is disposed between the first and second extension parts 113 and 114. The actuator body 123 is a rectangular parallelepiped piezoelectric ultrasonic motor with a plurality of piezoelectric elements stacked, and has a plurality of electrode terminals (not shown) at an outer surface thereof through which an external power is applied to. The actuator body 123 expands and contracts in a longitudinal direction and bends in a thickness direction with the power applied through the electrode terminals.

The first and second output members 121 and 122 are cylindrical frictional members integrally mounted at opposed ends of the actuator body 123 so as to be in contact with respective surface portions of the first and second extension parts 113 and 114. It is preferable that the first and second output members 121 and 122 are made of alumina of ceramic material.

The output members 121 and 122 may have semi-circular sections or elliptical sections to be in line contact with the inner surface portions of the first and second extension parts 113 and 114, as shown in FIGS. 4 to 7(a) and (b), but are not limited thereto. They can be configured to have various sections to form surface contacts.

In addition, the actuator 120 is horizontally fixed by a plurality of actuator supporters 151 on a base 150. Each of the actuator supporters 151 includes a body 152 in contact with a lower surface of the rectangular parallelepiped actuator body 123 and a pair of vertical ribs 153 extended vertically upward from the body 152 to hold the actuator body 123 fitted thereinto.

Each of the vertical ribs 153 has a protrusion 153a, which hooks onto an upper surface of the actuator body 123 to prevent detachment of the actuator body 123 fixed by the opposed vertical ribs 153.

Thereby, it is impossible for the actuator 120 to be detached upward from the actuator supporters 151 and is only flexible in the direction of pressure being applied thereto.

In addition, as shown in FIGS. 4 to 6, the preload member 130 is an elastic member in the form of a plate-spring provided above the actuator 120. It simultaneously applies pressures to the first and second extension parts 113 and 114 of the lens receiving part 110 against the actuator body 123 to maintain a status of pressed contact between the first and second extension parts 113 and 114 and the first and second output members 121 and 122.

Such a preload member 130 includes a horizontal plate 133 disposed above the actuator body 123. The horizontal plate 133 has free elastic ends 131 and 132 provided at opposed ends thereof which are bent perpendicular to the horizontal plate 133 so that the free elastic ends 131 and 132 are positioned to correspond to tips of the first and second output members 121 and 122.

Thereby, the free elastic ends 131 and 132 of the preload member 130 contact the first and second output members 121 and 122 provided at opposed ends of the actuator body 123, applying a predetermined magnitude of pressure to the first and second output members 121 and 122 toward the center of the actuator body 123. Thus, the free elastic ends 131 and 132 provide resilient force to generate contact pressure between the first and second output members 121 and 122 and the first and second extension parts 113 and 114 at contact points therebetween.

Here, it is preferable that lower ends of the free elastic ends 131 and 132 are extended in such a length that they are positioned lower than locations at which inner surface portions of the first and second extension parts 113 and 114 contact the tips of the first and second output members 121 and 122.

It is also desirable that the free elastic ends 131 and 132 have protrusions respectively protruded toward the first and second extension parts 113 and 114, partially contacting outer surfaces of the first and second extension parts 113 and 114 of the lens receiving part 110, thereby having increased resilient force.

In addition, the guide part 140 includes a plurality of guide rods 141 and 142 which assist the lens receiving part 110 to slide by guiding the movement of the lens receiving part 110 back and forth in the optical axis direction with respect to a base 150, which is a stationary member.

The guide rods 141 and 142 may be assembled into guide grooves 143 and 144 recessed in an outer surface of the barrel holder 112 of the lens receiving part 110, but is not limited thereto. They may also be inserted into guide holes (not shown) perforated in an outer surface of the barrel holder 112.

Here, the guide rods 141 and 142 have lower ends assembled into guide rod holders 155 provided on an upper surface of the base 150, and have upper ends fixed to inner surface portions of a casing 170 assembled onto the base 150 for covering the lens receiving part 110. Thereby, the guide rods 141 and 142 are vertically disposed in parallel with the optical axis direction between the casing 170 and the base 150.

In addition, as shown in FIGS. 4 to 6, the lens driving device 100 according to the present invention includes the base 150 with a substrate 160 having an image sensor 165, assembled on a bottom surface thereof, and the casing 170 having a predetermine dimension of inner space for housing the lens receiving part 110, the actuator 120, the preload member 130 and the guide part 140.

Here, the base 150 is a resin structure injection-molded to integrally form the holders 152 for horizontally fixing the actuator 120, the actuator supporters 151 having opposed vertical ribs 153, and guide rod holders 155 into which the lower ends of the guide rods 141 and 142 are assembled.

In addition, a window which exposes an image region of the image sensor 165 is formed on an upper surface of the base 150 in alignment with the optical axis of the lens receiving part 110.

Such a casing 170 is a cover member (not shown) assembled onto the base 150 and has an opening 175 of a predetermined dimension on an upper surface thereof to expose the lens barrel 111 of the lens receiving part 110.

The lens receiving part 110 containing at least one lens therein is moved back and forth along the optical axis direction by the drive power generated from the deformation of the actuator body 123 made of piezoelectric elements stacked, with the external power applied through the electrode terminals formed on the actuator body 123.

When a voltage of a resonance frequency level of about 222 kHz is applied to the body 123 of the actuator 120, the body 123 contracts and expands in a longitudinal direction together with the first and second output members 121 and 122. And as a voltage of a resonance frequency level of about 224 kHz is applied to the body 123, the body 123 is warped in an 'S' shape.

Therefore, when a voltage of a resonance frequency level of about 223 kHz, which is between the two resonance frequency levels, is applied to the actuator body 123, the actuator body 123 simultaneously generates the expanding/contracting vibration mode in a longitudinal direction and the bending vibration mode in a thickness direction. Thus, as shown in FIGS. 7(a) and (b), the first and second output members 121 and 122 mounted at opposed ends of the actuator body 123 are affected by combination of the expansion/contraction deformation and bending deformation such that the first output member 121 makes a counterclockwise B1 elliptical motion while the second output member 122 makes a clockwise B2 elliptical motion, with respect to the actuator body 123 viewed from the side.

That is, the vibrations should be combined such that the tips of the first and second output members 121 and 122 make opposite directions of elliptical motions to facilitate up and down linear movement of the actuator 120.

Thus, the tips of the first and second output members 121 and 122 make linear movements in the downward direction indicated by the arrow A, with respect to the actuator body 123 viewed from the front side.

In addition, the directions of the elliptical motions of the first and the second output members 121 and 122 are changed forward or backward according to the polarity of the voltage applied to the actuator body 123 so that the tips of the first and second output members 121 and 122 linearly move back and forth in upward and downward directions.

In this case, when the actuator 120 is operating, the rotating power of the first and second output members 121 and 122 making elliptical motions is transmitted to the first and second extension parts 113 and 114 through the tips of the output members 121 and 122.

Subsequently, assembled vertically slidable against the guide rods 141 and 142 of the guide part 140, the lens receiving part 110 of the barrel holder 112 having the first and second extension parts 113 and 114 is moved back and forth in upward and downward directions in parallel with the optical axis direction, together with the lens barrel 111 containing the lens therein.

Here, the frictional power or the drive power for moving the lens receiving part 110 generated between the first and second output members 121 and 122 and the first and second extension parts 113 and 114 should be greater than the frictional power generated between the lens receiving part 110 and the guide grooves 143 and 144 in order to facilitate the up and down movement of the lens receiving part 110.

According to the lens driving device of the present invention set forth above, there are provided first and second extension parts extended at opposed sides from a lens receiving part, an actuator disposed between the extension parts, having first and second output members at opposed sides thereof, a preload member applying pressure to maintain a contact state between the first and second extension parts and the first and second output members and a guide part guiding the movement of the lens receiving part along an optical axis direction. Thereby, the drive power generated at the actuator when power is applied is instantaneously transmitted to the lens receiving part through the first and second extension parts in contact with the first and second output members. Thus, the lens driving device moves the lens barrel along the optical axis more stably to improve the optical characteristics of the optical device. It also has high drive power generated with low input voltage to increase the speed of driving the lens, an increased transport range of the lens, and a minimal loss of drive power, thereby enhancing driving efficiency.

While the present invention has been shown and described in connection with the preferred embodiments, it will be apparent to those skilled in the art that modifications and variations can be made without departing from the spirit and scope of the invention as defined by the appended claims.

What is claimed is:

1. A lens driving device comprising:
a lens receiving part with a lens disposed therein, the lens receiving part having first and second extension parts formed at opposed sides in a predetermined interval from each other;
an actuator having a body between the first and second extension parts, the body having first and second output members contacting the first and second extension parts of the lens receiving part at opposed ends thereof, thereby expanding, contracting and bending when power is applied, whereby the actuator provides power necessary for driving the lens receiving part;
a preload member provided above the actuator, the preload member compressing the first and second extension parts against the actuator body to maintain a status of pressed contact between the first and second extension parts and the first and second output members; and
a guide part for guiding the movement of the lens receiving part in an optical axis direction,
wherein the preload member comprises a horizontal plate disposed above the actuator body, the horizontal plate having free elastic ends at opposed ends thereof bent perpendicular to the horizontal plate, the free elastic ends contacting tips of the first and second output members, respectively.

2. The lens driving device according to claim 1, wherein the lens receiving part comprises a lens barrel for receiving the lens and a barrel holder for receiving the lens barrel in a center thereof, the barrel holder having the first and second extension parts at outer ends thereof.

3. The lens driving device according to claim 1, wherein the actuator comprises a piezoelectric ultrasonic motor having the rectangular parallelepiped body with a plurality of piezoelectric elements stacked.

4. The lens driving device according to claim 1, wherein the first and second output members comprise frictional members.

5. The lens driving device according to claim 1, wherein both of the first and second output members have tips which are configured to make elliptical movements in opposite directions from each other.

6. The lens driving device according to claim 1, wherein the free elastic ends extend in such a length to be positioned lower than locations where inner surfaces of the first and second extension parts contact the tips of the first and second output members.

7. The lens driving device according to claim 1, wherein the free elastic ends have protrusions protruded toward the first and second extension parts.

8. The lens driving device according to claim 1, wherein the guide part comprises a guide groove recessed at an outer surface of the lens receiving part and a guide rod disposed in contact with the guide groove.

9. The lens driving device according to claim 1, wherein the guide part comprises a guide hole perforated in an outer surface of the receiving part and a guide rod inserted through the guide holes.

10. The lens driving device according to claim 1, further comprising a base disposed below the lens receiving part, the base having an actuator supporter for supporting the actuator horizontally and a guide rod holder into which a guide rod is assembled.

11. The lens driving device according to claim 10, wherein the actuator supporter comprises a body in contact with a lower surface of the actuator body and a pair of vertical ribs extended vertically upward from the body to hold the actuator body stably.

12. The lens driving device according to claim 10, wherein each of the vertical ribs has a protrusion at an upper end thereof, the protrusion hooking onto an upper surface of the actuator body to prevent the actuator body from being detached.

* * * * *